United States Patent
Dawood

(10) Patent No.: US 9,754,385 B2
(45) Date of Patent: Sep. 5, 2017

(54) EFFICIENT ENCODING OF COMPOSITED DISPLAY FRAMES

(71) Applicant: Citrix Systems, Inc., Fort Lauderdale, FL (US)

(72) Inventor: Muhammad Dawood, High Wycombe (GB)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 94 days.

(21) Appl. No.: 14/670,283

(22) Filed: Mar. 26, 2015

(65) Prior Publication Data
US 2016/0284105 A1 Sep. 29, 2016

(51) Int. Cl.
| | | |
|---|---|---|
| G06T 9/00 | (2006.01) | |
| H04N 19/12 | (2014.01) | |
| H04N 19/137 | (2014.01) | |
| H04N 19/167 | (2014.01) | |
| H04N 19/507 | (2014.01) | |

(52) U.S. Cl.
CPC ............ G06T 9/00 (2013.01); H04N 19/12 (2014.11); H04N 19/137 (2014.11); H04N 19/167 (2014.11); H04N 19/507 (2014.11)

(58) Field of Classification Search
None
See application file for complete search history.

(56) References Cited

U.S. PATENT DOCUMENTS

| | | | | |
|---|---|---|---|---|
| 8,442,311 | B1* | 5/2013 | Hobbs | G06T 9/00 382/166 |
| 8,606,029 | B1 | 12/2013 | Wong et al. | |
| 8,965,140 | B1* | 2/2015 | Xu | G06K 9/38 382/195 |
| 2011/0099154 | A1* | 4/2011 | Maydew | G06F 17/30156 707/692 |

FOREIGN PATENT DOCUMENTS

WO     WO 2010/085899 A1     8/2010

OTHER PUBLICATIONS

PCT Patent Application US2015/026245 filed Apr. 16, 2015; International Search Report and Written Opinion dated Dec. 4, 2015.

\* cited by examiner

*Primary Examiner* — Yingchun He
(74) *Attorney, Agent, or Firm* — Finnegan, Henderson, Farabow, Garrett & Dunner LLP

(57) ABSTRACT

Computer-implemented systems and methods are disclosed for encoding a display frame, wherein the systems and methods acquire a plurality of display frames. The computer implemented systems and methods further detect transient regions for a display frame of the plurality of display frames. Systems and methods are disclosed for encoding transient regions of a display frame using a first encoding mechanism if the display frame contains transient regions. Further, systems and methods are disclosed for encoding non-transient regions using a second encoding mechanism if the display frame contains non-transient regions.

17 Claims, 12 Drawing Sheets

EFFICIENT ENCODING OF COMPOSITED DISPLAY FRAMES

BACKGROUND

Modern computing systems are capable of running a large variety of software applications and platforms. A computing system can provide an operating system allowing applications executing on the computing system to access and interact with hardware components of the computing system. Through this interaction, the software applications can accept user input and provide output, which can be presented to the user through a graphical user interface presented on a display device. Additionally, the output can be forwarded to a remote computing device.

Remote computing technologies allow users to use a computing system without being physically located at the computing system. Through remote access, users can connect to a remote computing system over a public or private network. The user can use a local computing system to send input to the remote computing system and the remote computing system can respond. Although not physically present at the remote computing system, the user can interact with the remote computing system as though the user was using the system directly.

Additionally, virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running Microsoft Windows operating system may host a virtual machine that simulates a computer running a Linux operating system, based on which Linux-based software can be executed.

Further, virtualization technologies can provide remote access to computer resources across public or private networks. Users can use a variety of clients to access a virtual desktop or applications running on a host computer in the virtualized environment. These clients can be directly connected to the host computer or they can connect to the virtualized environment through a public or private network. The client can capture user input and transfer it across the network to the host computer's virtual environment. The application receiving the user input can respond by performing some action and presenting a response to the user. Virtualization allows multiple users to share hardware resources instead of requiring that each user connect to a dedicated remote computing system.

Applications running in a remote, local, or virtualized computing environment can respond to user input updating the output for display on a display device. An application can provide the operating system with instructions to update the graphical user interface. The operating system can then process the commands and display the update on a graphical interface. In many current and past system architectures, applications could write directly to a frame buffer through the operating system. In addition to the frame to be displayed, the operating system could provide the raw draw commands and additional information about the updated display frame such as the content type of the displayed content, the modified region of the output display frame, and other metadata about the output display frame. This information can be useful for remote technologies because instead of simply sending a bandwidth intensive graphic representing a visual display over a network, the system could combine the raw draw commands and the additional information about the display frame to optimize data sent to the remote computing environment. This optimization allowed for a much better user experience while limiting the network bandwidth required for remote computing.

Modern operating systems have moved away from past display mechanisms, relying instead on offloading rendering of the user interface to graphics processing units. As a result, the operating system receives updates from the applications, composites those updates into a display frame using the graphics processing unit, and provides a graphic or bitmap representing the composited frame to the display device or graphics system. As a result the graphics system of the computing environment only receives a final composited display frame without any additional metadata or draw commands. Accordingly, a graphics driver forwarding the display to a remotely connected user can no longer benefit from the previously provided information. This has necessitated new mechanisms for optimizing the transmission of the user display to clients.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide technologies and techniques for processing a display frame. These technologies operate in both a virtual and non-virtual environment allowing for the optimization of display output that is forwarded to remote clients. These techniques provide significant benefits in the transmission of visual data across public and private networks. Not only do these optimizations improve the user experience for remote users, these optimizations result in a substantial reduction in the required network infrastructure and bandwidth required to allow for remote computing.

The technologies and techniques described herein allow for detection of rapidly changing regions of a display frame and encoding of those rapidly changing regions using a compression algorithm designed to handle transient visual data. Further, the technologies and techniques described herein can efficiently determine values representative of various regions of the display frame in a manner that allows efficient searching through a cache of previously processed bitmaps. These bitmaps can contain a sequence of bits that define a display frame. In allowing such searching, the technologies and techniques described herein can result in improved cache usage leading to a significant reduction in CPU, memory, and bandwidth requirements for transmitting display frames across a network. Additionally, the technologies and techniques described herein can process non-cached and non-encoded regions of a display frame, determining if the various sub-regions of the display frame should be encoded using lossy or lossless compression and maintaining a balance between quality and efficiency to provide an improved user experience.

Figure 1:
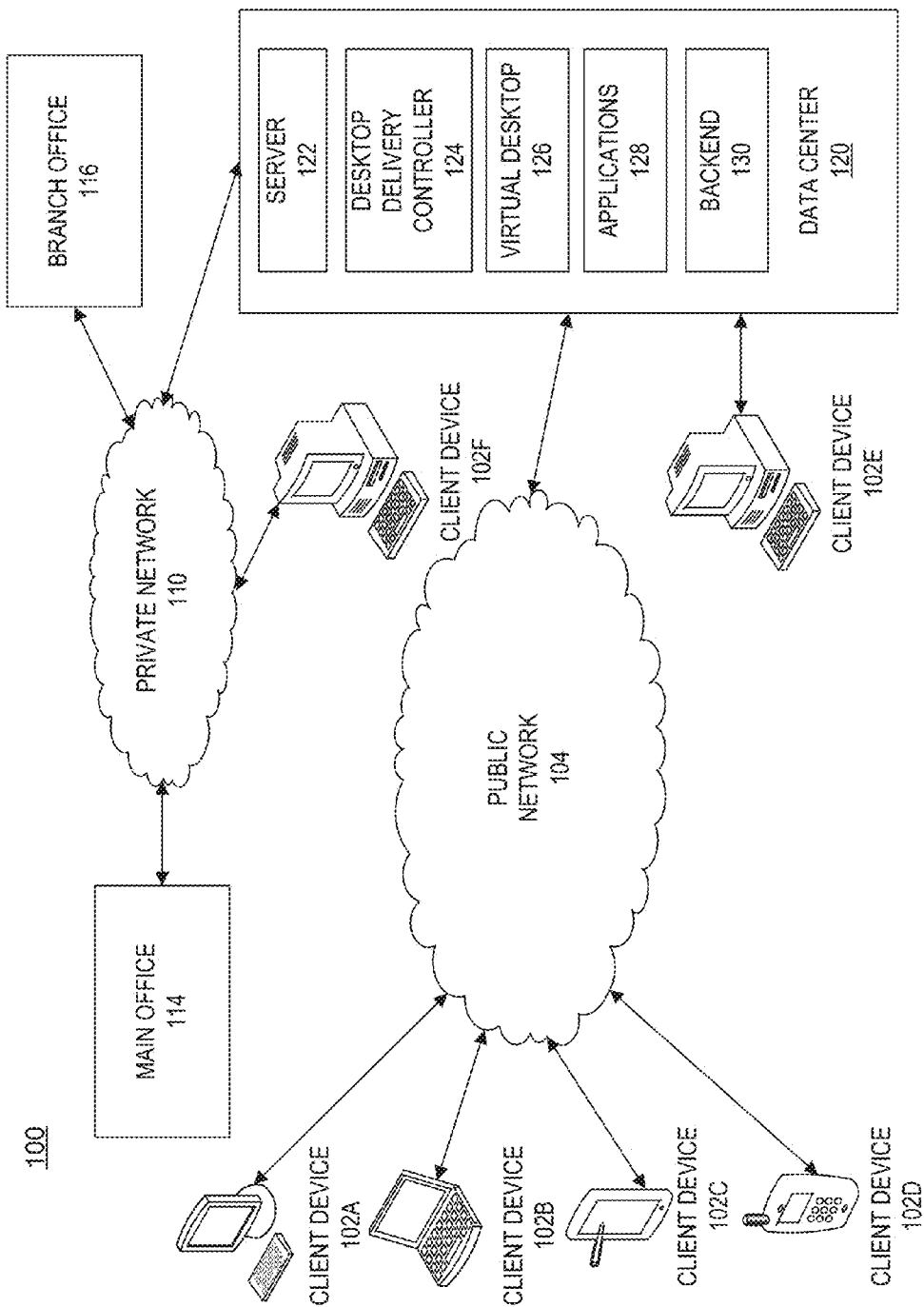
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiments, a main office 114 and a branch office 116 can also include one or more client devices that are similar to client devices 102A-F. Main office 114 can be located, for example, in a principal place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g., client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device (e.g., such as a smartwatch or any other wearable device) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 includes a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™ or SAP™-based applications and computing resources. Via the communication subsystem, server 122 can communicate with other devices (e.g., client devices 102) through various types of networks (e.g., private network 110 and public network 104). Server 122 can include features provided in other components of data center 120, such as virtual desktop 126, applications 128, and/or desktop delivery controller 124. In some embodiments, a client device acts as server 122 by providing functionality consistent with server 122.

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof. Users can interact with one or more of the virtual desktops 126 through client device 102. In some embodiments, virtual desktop 126 responds to user input by providing an updated visual display forwarded from the virtual desktop to the client device.

Backend system 130 can be a single or multiple instances of computer networking hardware, appliances, or servers in a server farm or a bank of servers. Backend system 130 can interface directly or indirectly with server 122. For example, backend system 130 can include Microsoft Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP) server. Backend system 130 can provide data, services, or a combination of both to data center 120, which can then provide that information via varying forms to client devices 102 or branch office 140.

Figure 2A:
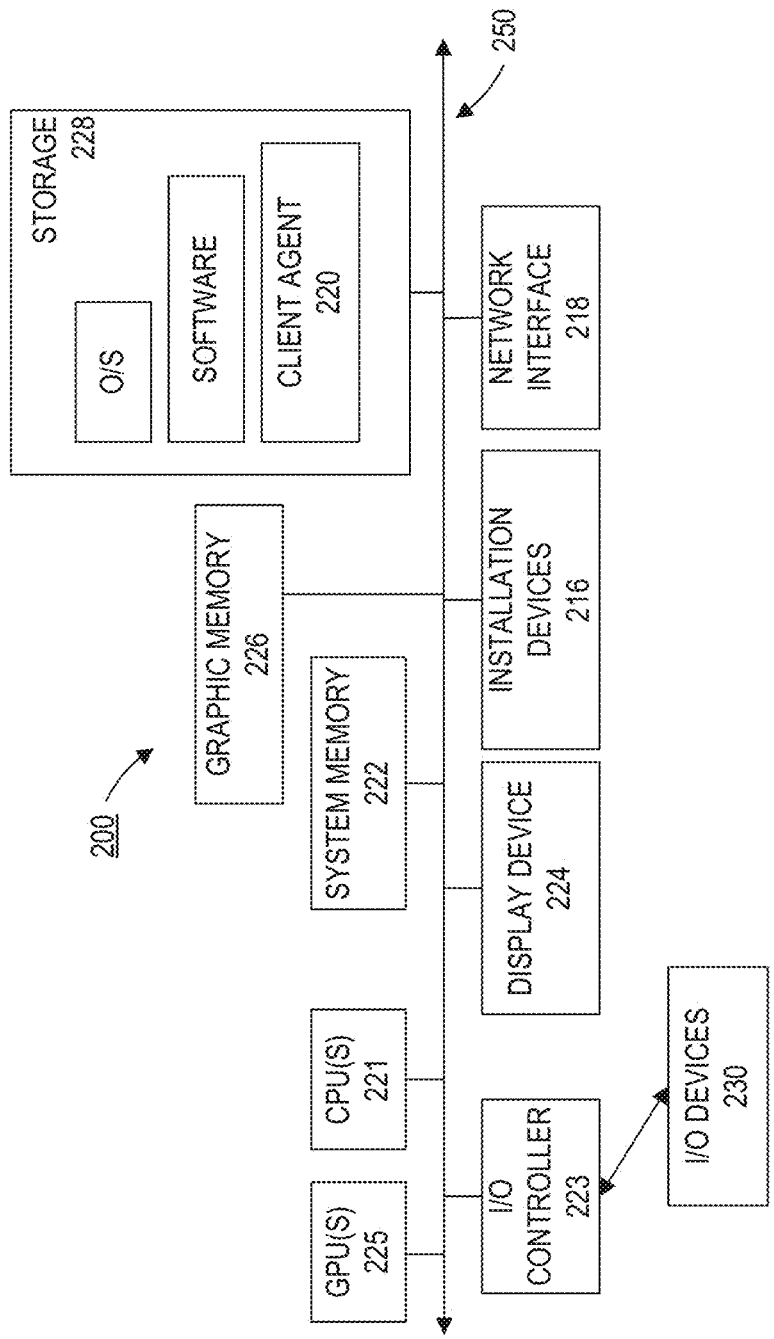
FIGS. 2A-2C are block diagrams of an exemplary computing device, consistent with embodiments of the present disclosure.
Figure 2B:
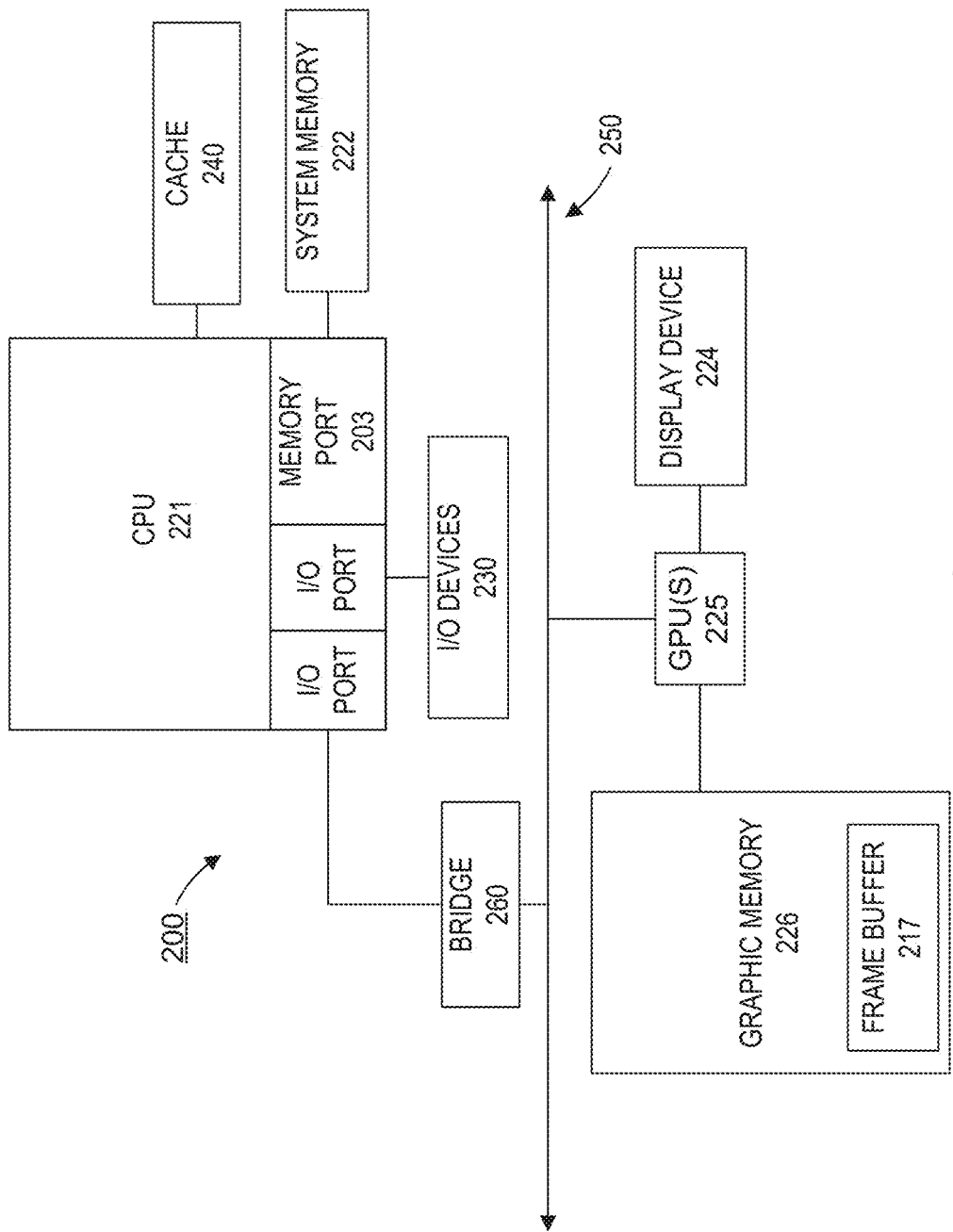
Figure 2C:
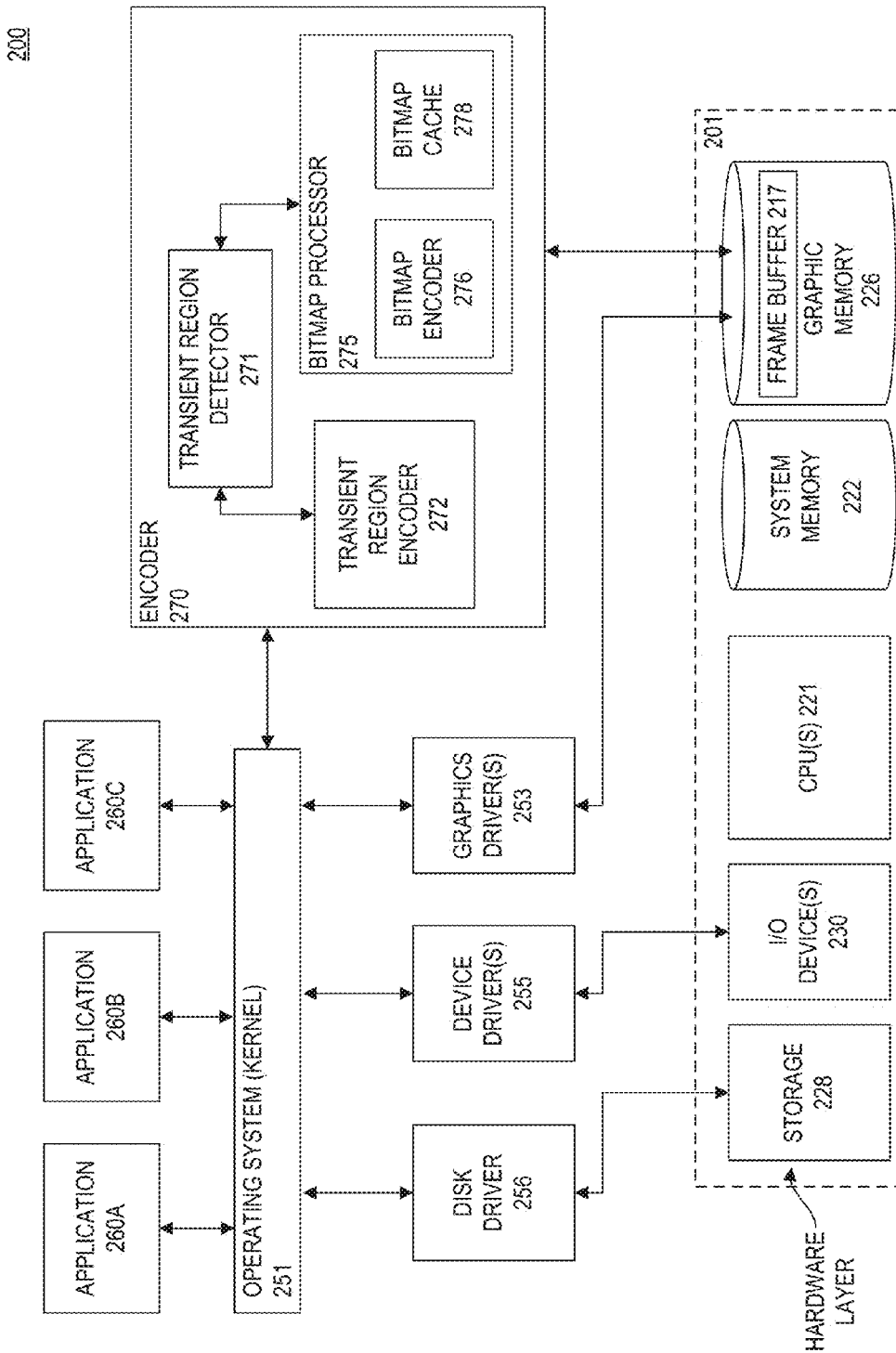

FIGS. 2A-2C are block diagrams of an exemplary computing device 200, consistent with embodiments of the present disclosure. Computing device 200 can be server 122 in data center 120 as shown in FIG. 1. As shown in FIG. 2A, computing device 200 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). CPUs 221 can also contain a plurality of processor registers for storing variable types of data. For example, these registers can store data, instructions, floating point values, conditional values, and/or addresses for locations in system memory 222. CPU registers can include special purpose registers used to store data associated with the running process such as an instruction pointer, instruction counter, and/or a memory stack pointer. The system memory 222 can include a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), a flash drive and/or flash memory, processor cache, memory register, or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250. GPUs 225 can be any type of specialized circuitry that can manipulate and alter memory (e.g., graphic memory 226) to provide and/or accelerate the creation of images stored in a frame buffer (e.g., frame buffer 217 shown in FIG. 2B) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operate on data stored in system memory 222 and communicate with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 222 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Computing device 200 can also include display device 224 and an input/output (I/O) device 230 (e.g., a keyboard, mouse, or pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for computing device 200.

FIG. 2B depicts an embodiment of an exemplary computing device 200 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 communicate with cache 240 via system interface 250. Cache 240 typically has a faster response time than system memory 222. In some embodiments, such as the embodiment shown in FIG. 2B, CPUs 221 communicate directly with I/O device 230 via an I/O port. In further embodiments, I/O device 230 can be a bridge 260 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Thunderbolt™ bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 217. Frame buffer 217 can be a graphic output device that drives a display device (e.g., display device 224) from a memory buffer of graphic memory 226 containing a complete frame of graphical data. Frame buffer 217 can store the final graphic frames, which are to be displayed on display device 224.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; flash drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

In some embodiments, an operating system executes on the components of computing device 200. The operating system can use a graphics driver to interact with the graphics system (e.g., GPUs 225, graphic memory 226, frame buffer 217, and display device 224). A graphics driver can exist in a virtualized and non-virtualized computing environment. The graphics driver can instruct GPUs 225 to perform operations and store the results in frame buffer 217 for display on display device 224. In some embodiments, instead of displaying the contents of frame buffer 217 on display device 224, the graphics driver further processes the display frames stored in frame buffer 217 and forward the contents of frame buffer 217 to a communicatively coupled (e.g., through network interface 218) computing device (e.g., client 102).

FIG. 2C depicts an embodiment of an exemplary computing device 200. Computing device 200 can include storage 228, I/O device(s) 230, CPU(s) 221, system memory 222, frame buffer 217, graphic memory 226 as part of a hardware layer 201 (which can be structured as shown in FIGS. 2A-2B). Computing device 200 can execute operating system 251. Additionally, computing device 200 can execute applications 260A-C. Applications 260A-C can use functionality provided by operating system 251 to interact with the hardware layer 201 provided by computing device 200.

Operating system 251 can use device drivers to communicate with components in hardware layer 201. For example, operating system 251 can use disk driver 256 to interact with storage 228, device driver(s) 255 to interact with various I/O devices 230, and graphics driver 253 to interact with frame buffer 217, graphic memory 226, and other aspects of the graphics system (e.g., GPU(s) 225 and display device 224 as shown in FIGS. 2A-2B). Computing device 200 could contain many additional device drivers to facilitate interaction with other hardware not pictured.

Additionally, operating system 251 can interact with components designed to perform different tasks related to enhance computing device 200. Encoder 270 can communicate with operating system 251 and frame buffer 217 to further process display frames produced by operating system 251. Encoder 270 can provide special functionality to optimize transmission of the display frames to remote computing devices (e.g., client device 102). In some embodiments, encoder 270 encodes a display frame reducing the storage footprint and providing a balance between size and quality for transmitting the display frame across a network.

Encoder 270 is one or more modules, which can be packaged functional hardware units designed for use with other components or a part of a program that performs a particular function, corresponding to the particular step, of related functions. The one or more modules of encoder 270 can include a transient region detector 271, a transient region encoder 272, and a bitmap processor 275. In some embodiments, these components are separate modules communicatively coupled to encoder 270 instead of contained within encoder 270. Transient region detector 271 can be one or more modules for comparing the display frame with previous display frames and data stored in memory (e.g., system memory 222, cache 240, or CPU registers) to determine regions of the screen that are rapidly changing. Various characteristics can indicate a region is transient. These characteristics are discussed in more detail below in reference to FIG. 3. Transient region detector 271 can divide a display frame into transient regions provided to the transient region encoder 272 and non-transient regions provided to bitmap processor 275. In some embodiments, transient region detector 271 detects when a previously identified transient region is no longer transient, causing the encoder to provide that region to bitmap processor 275 for subsequent encoding.

Transient region encoder 272 can be one or more modules for processing the transient regions according to the characteristics of the transient region and the purpose of encoder 270. In some embodiments, transient region encoder 272 uses a compression mechanism suited for rapidly changing images such as video. Transient regions can require less quality than non-transient regions and transient region encoder 272 can reduce the quality at which transient regions are drawn, decreasing the amount of memory required to store the region and the bandwidth necessary to transmit the region across a network.

Bitmap processor 275 can be one or more modules for processing non-transient regions. To assist with processing, bitmap processor 275 can contain bitmap encoder 276 and bitmap cache 278. Bitmap processor 275 can obtain non-transient regions that were previously processed in bitmap cache 278. Bitmap processor 275 can provide any regions not found in bitmap cache 278 to bitmap encoder 276 for additional processing. In some embodiments, bitmap encoder 276 and/or bitmap cache 278 are separate and distinct from bitmap processor 275 and/or encoder 270. The details of bitmap cache 278 are discussed in further detail below in referring to FIGS. 4-5.

Bitmap encoder 276 can be one or more modules for determining the optimal encoding method for different areas of the remaining non-transient regions of the display frame. Bitmap encoder 276 can use multiple techniques to determine these encoding methods. In some embodiments, for example, bitmap encoder 276 classifies regions of the display frame as having large changes or small changes. In these embodiments, regions having large changes can be encoded using a lossless encoding algorithm while regions having small changes can be encoded using a lossy compression algorithm (e.g., Joint Photographic Experts Group ("JPEG") format) to reduce the memory footprint of those regions. Bitmap encoder 276 can use a lossless algorithm (e.g., Portable Network Graphics ("PNG"), Tagged Image File Format ("TIFF"), or JPEG 2000 ("JP2") format) to encode regions having large changes to preserve quality. Details related to bitmap encoder 276 are discussed in further detail below in reference to FIG. 6.

After the non-transient regions have been processed, encoder 270 can encode each portion of the display frame according to the determinations made during the processing by transient region encoder 272, bitmap processor 275, and bitmap encoder 276. After the display frame is encoded, encoder 270 can forward the frame to a remote device (e.g., client device 102) or provide the encoded display frame to another component of computing system 200.

Figure 3:
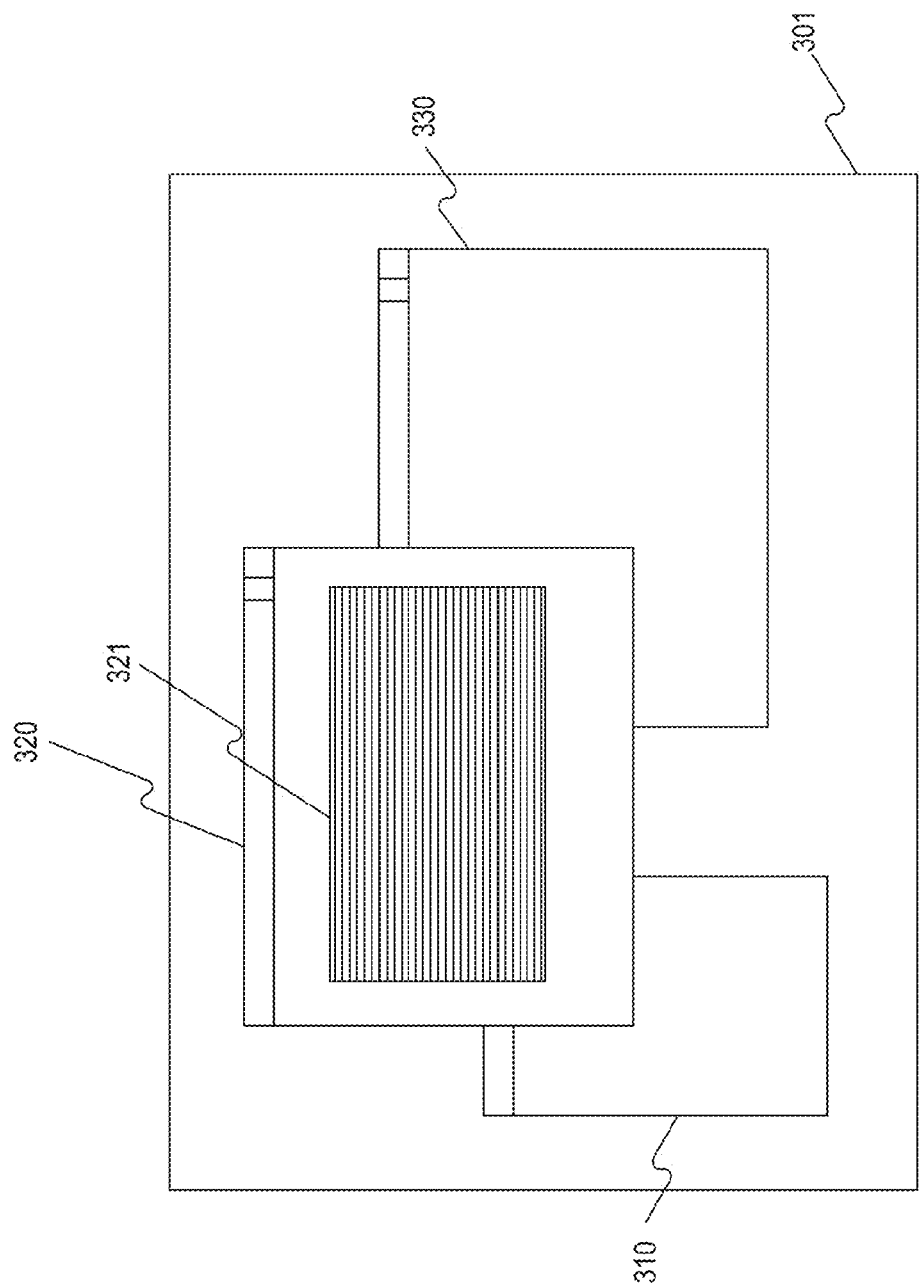
FIG. 3 illustrates an exemplary user desktop, consistent with embodiments of the present disclosure.

FIG. 3 illustrates an exemplary user desktop 301, consistent with embodiments of the present disclosure. User desktop 301 can provide a visual representation of the state of applications running on the computing system. User desktop 301 can be presented on a display device (e.g., display device 224 or a display device attached to remote client device 102). The user can then interact with the system through input devices (e.g., I/O devices 230) and the results of that interaction on user desktop 301 are presented to the user through the display device.

User desktop 301 can contain application windows (e.g., windows 310, 320 and 330) corresponding to applications or processes running on the computing system. These application windows can provide the user with a visual representation of the application. Application windows 310, 320, and 330 can represent a variety of applications. For example, an application can be a web browser, a word processor, a spreadsheet application, an image editor, an instant messaging client, a video player, a music player, or grouping of instructions executing on the computing system. In some embodiments, an application provides multiple application windows. For example application window 320 and application window 310 can represent data for the same application or process. In some embodiments, different application windows can represent the same type of applications. For example application window 320 and application window 330 can both represent a web browser application.

Application windows can further contain content and various sub-components (e.g., content 321) specific to the application represented by the application window. For example, application window 320 can represent a web browser. The web browser application can, for example, use application window 320 to display the rendered text of a website. Further, for example, application window 320 can contain content 321. In the context of a web browser, for example, content 321 can be an image or video related to the web page being displayed in application window 320. For example, content 321 could be a YouTube™ video playing within application window 320.

A user can interact with application windows (e.g., application windows 310, 320, and 330) in various ways. A user can minimize an application window hiding it from view on user desktop 301. A user can maximize an application window making it as large as user desktop 301. A user can move application windows by dragging the top bar of the application window or can change the size of the application window by dragging a handle on a side or corner of the application window.

Additionally in manipulating application windows on user desktop 301, a user can cause some application windows to overlap. For example, application window 320 overlaps application windows 310 and 320 hiding portions of application windows 310 and 320 from view. A user can change the layering or order of overlap of the application windows. For example, the user can click or otherwise move focus to application window 330, making application 330 the topmost window. In this example, application window 330 would be fully visible overlapping a portion of application 320.

As a user interacts with user desktop 301, the operating system (e.g., operating system 251 running on server 122) updates the display frame representing user desktop 301. When an application window (e.g., application window 310, 320, or 330) on user desktop 301 changes, the application corresponding to the application window instructs the operating system to update the display of the application window. The operating system can combine updates from all of the application windows compositing them into one unified display frame. In some embodiments, the operating system uses a GPU (e.g., GPU 225) for compositing and other graphic operations necessary to create a final display frame representing all updates to user desktop 301. After it is composited, the final display frame can be stored in a frame buffer (e.g., frame buffer 217) until output on the display device (e.g., display device 224) or forwarded to a remote client (e.g., remote client device 102) for display. The display frame can be stored as a bitmap image ready for display. These types of display mechanisms can be referred to as compositing window managers. Examples of compositing window managers include Quartz Compositor in Mac OS X, Desktop Window Manager in Microsoft Windows 7 and later versions, KWin, Compiz, and 3Dwm among others. By compositing the display frame within a compositing window manager instead of allowing applications to update a frame buffer directly, the operating system can exert more control over how application updates are represented in the final composited display frame. It is appreciated that embodiments consistent with the present disclosure are compatible with any display system where the output includes a display frame and are not limited to display systems classified as compositing window managers.

In a remote computing environment, including a virtualized computing environment for remote clients (e.g., client 102), the contents of a frame buffer (e.g., frame buffer 217) can be forwarded to the remote client and the remote client can present the display frame to the user. In environments where applications can write directly to the frame buffer, the components responsible for forwarding the display frame can use the additional information provided by the operating system to optimize the data sent to the remote client for display. With the advent of compositing window managers, however, in some embodiments, only the final display frame is provided to the graphics pipeline hindering previous methods of optimizing the display frame.

Encoder 270, instead of placing the composited frame in frame buffer 217 for display, can process the composited display frame and forward the results to a remote client (e.g., client 102). It is appreciated that other systems and components within the computing environment can implement embodiments consistent with the present disclosure. Accordingly, the present disclosure of a dedicated encoder component is exemplary. Subsequent figures, diagrams, and descriptions will reference encoder 270 and its components as exemplary for implementing embodiments consistent with the present disclosure but is not intended to limit the disclosure to the structure of encoder 270.

As the user desktop changes, the encoder can process the newly created display frames. In some embodiments, the operating system provides the encoder with a region of the display frame containing all areas of the display that have changed from the previous display frame. Further, encoder 270 can determine the region of the display frame that has changed from the previous display frame.

Encoder 270 can begin processing changes to user desktop 301 detecting transient regions, for example, using transient region detector 271. Transient region detector 271 can determine regions of user desktop 301 that are rapidly changing. For example, content 321 can represent a video. Each display frame can contain a new video frame that is different from the video frame in the previous display frames. While processing a display frame, transient region detector 271 can determine that the video of content 321 is transient based on the number of previous display frames in which new video frames occurred. If more than a specified threshold of previous display frames contained new video frames, transient region detector 271 can determine that the video of content 321 represents a transient region of the current display frame.

Transient regions can be defined by many different characteristics. In some embodiments, a determination that a region is transient involves considering the size of the region, the stability of the region, and/or whether the region contains regions that have previously been cached. For example, in some embodiments, only regions over 20,000 pixels can be considered transient. In some embodiments, only regions that are stable in size and/or location can be considered transient. In these embodiments, minor changes in the size and/or location of the region can be ignored. The amount of tolerance for changes in these embodiments can be adjusted based on the requirements of the system. Further, regions that have previously appeared in the cache can indicate that a region is not transient. For example, a region previously being found in the cache can indicate that a window is being moved by the user instead of a frequently changing area that is transient. Conversely, regions containing video content can result in lower cache hit rates because video frames typically do not repeat themselves. In some embodiments, if less than 20% of the region has been found in the cache for previous display frames, the region can be considered transient. The characteristics used by these embodiments are only exemplary. Any characteristics that can provide an indication that a region is rapidly changing can be used as a basis for determining transient regions.

After transient region detector 271 determines that a region of the display frame is transient, the transient region detector can provide that region to an encoding component, such as transient region encoder 272. Transient region encoder 272 can encode the transient portion of the display frame using a compression and/or encoding mechanism chosen for encoding transient regions. For example, transient region encoder 272 can use a compression algorithm that decreases the quality but improves the bandwidth necessary for sending the region to a remote client. After encoding any transient regions, the encoder can remove the encoded regions from the display frame and can continue processing the remaining portion of the display frame, for example, through bitmap processor 275.

Bitmap processor 275 can process the non-transient regions of a display frame, combining previously encoded regions of the frame stored in a cache and newly encoded portions of the display frame not previously processed. To determine which regions have been previously processed, bitmap processor 275 can determine match points representative of certain characteristics of the display frame as an index to the cached bitmaps.

Figure 4:
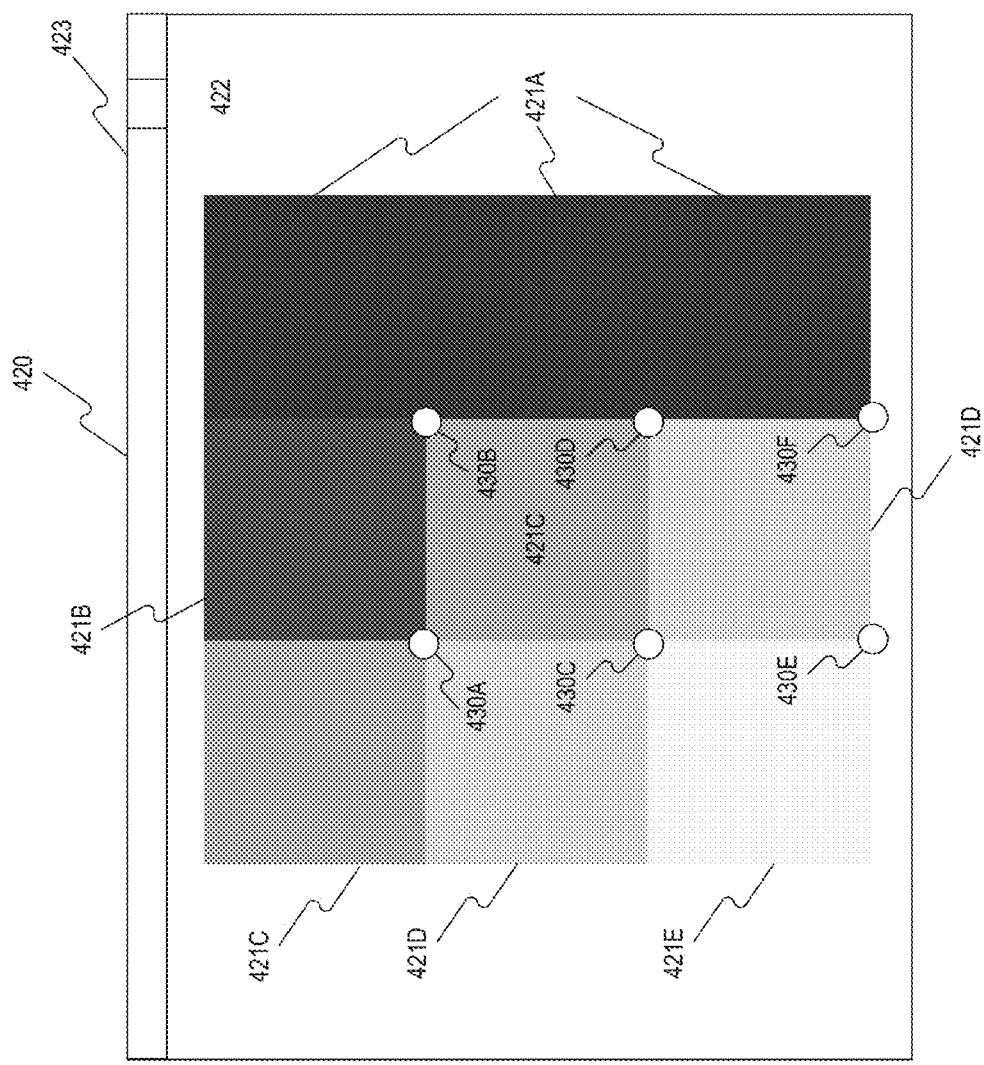
FIG. 4 illustrates an exemplary application window, consistent with embodiments of the present disclosure.

FIG. 4 illustrates an exemplary application window 420, consistent with embodiments of the present disclosure. Application window 420 can be any application on a user's desktop (e.g., application window 320 on user desktop 301 in FIG. 3). Application window 420 can contain content 421 (represented as 421A, 421B, 421C, 421D, 421E). Additionally, application window can include window background region 422 and menu bar 423. Menu bar 423 can also include controls and components that are not pictured in FIG. 4. Further, application window 420 can represent a non-transient region of a display frame being processed by bitmap processor 275. It is appreciated that bitmap processor 275 can process a larger non-transient region of which application window 420 is only a portion. Further, during processing, bitmap processor 275 can ignore individual distinctions between the sub-parts of application window 420, considering the entirety of application window 420 (e.g., content 421, background 422, and menu bar 423).

In some embodiments, bitmap processor 275 processes application window 420 by determining match points and match point scores based on characteristics of the application window. Match points 430 can be based on characteristics of content 421, background 422, and/or menu bar 423. After determining the match points 430 (represented as 430A, 430B, 430C, 430D, 430E, 430F) and the match point scores, bitmap processor 275 can search for previously processed regions of application window 420 in bitmap cache 278. If previously processed regions are found, the previously processed regions can be reused to decrease the bandwidth, processing, and memory necessary to provide application window 420 to a remote client (e.g., client 102) and or other components of computing system 200.

Application window 420 can display different types of information as content 421 and background 422. Anything that the operating system (e.g., operating system 251 of FIG. 2C) is capable of displaying can be displayed in application window 420. For example, application window 420 can include, among other things, text, video, and/or images and can be in grayscale or color depending on the application.

A match point can represent a particular portion of the display frame. In some embodiments, a match point is a reference point to a particular portion of the display frame. A match point can reference a particular pixel in the display frame. Bitmap processor 275 can determine match points based on an analysis of the individual pixels in the display frame.

Bitmap processor 275 can determine a representative pixel value for each pixel in the display frame. The representative pixel value can be any value based on characteristic(s) of a pixel that can be used to compare the pixel to another pixel in the display frame. The representative pixel value can be the result of a mathematical formula based on some or all of the values of the pixel's color channels (e.g., the average of the integer value of each color channel of the pixel). Further, the representative pixel value can be the 3-byte sequence representing the pixel in the display frame. In some embodiments, a representative pixel value is a 4-byte sequence that includes a byte representing each of the pixel's color channels and the next byte in the display frame image data. In these embodiments, comparing 32 bits can provide better performance than comparing 24-bit values because of the internal architecture of the underlying processor (e.g., CPU 221). Accordingly, the comparisons used can be modified based on the underlying computer hardware to improve efficiency. By comparing the representative pixel values, bitmap processor 275 can determine pixels or portions of the display frame that meet certain criteria for determining a match point.

Bitmap processor 275 can scan each line of the non-transient region of a display frame pixel by pixel to determine which pixels are match points. As each pixel is scanned, bitmap processor can compare the pixel to adjacent pixels and determine if the pixel meets the criteria for a match point. The pixel comparisons can be based on the representative pixel values for each pixel.

In some embodiments, a match point is be defined as a pixel having a representative pixel value greater than or equal to the representative pixel value of the pixel to its left, greater than the representative pixel value of the pixel to its right, less than or equal to the representative pixel value of the pixel above, and less than the representative pixel value of the pixel below. These characteristics are exemplary. Different combinations of criteria and comparisons can be used to determine which pixels or regions of a display frame are match points. The criteria can be chosen to produce enough match points to maximize cache hits when searching bitmap cache 278 while at the same time limiting the complexity of match point determinations to prevent inefficient processing by the CPU (e.g., CPU 221).

As shown in FIG. 4, content 421A, 421B, 421C, 421D, and 421E can be separate pixel regions where the representative pixel values in each region have a consistent grayscale value. Further, background 422 can be a white background. Each content region of content regions 421 can have pixels with different values. For example, the value of pixels in 421A can be less than the value of the pixels in 421B, the value of the pixels in 421B can be less than the value of the pixels in 421C, the value of the pixels in 421C can be less than the value of the pixels in 421D, and the value of the pixels in 421D can be less than the value of the pixels in 421E. Further, in this example, the representative pixel value of the pixels in background region 422 can be greater than any of the pixel values in content regions 421.

In this example, and using the previously identified exemplary criteria for determining match points, bitmap processor 275 can determine match points 430A-F while processing each line of content regions 421, background 422, and menu bar 423. For example, match point 430B can represent a pixel at the border of pixel regions 421A, 421B, and 421C. In this example, bitmap processor 275 can compare the pixel values using their grayscale integer value.

Because of the relative representative pixel values of the pixels in each region, the pixel at match point 430B can have a representative pixel value equal to the representative pixel value of the pixels above and to the left, less than the representative pixel value of the pixel below, and greater than the representative pixel value of the pixel to the right.

In some embodiments, bitmap processor 275 skips every third line of application window 420 during processing. Match points can assist with finding previously displayed regions of the display frame that have moved or shifted. In these embodiments, skipping every third line can provide a sufficient set of match points that any movement of a window can result in match points that have been previously processed and cached. Although pixels in every skipped line can still be used in comparisons of the lines of pixels above and below, bitmap processor 275 can avoid processing each specific pixel in the skipped line. By skipping every third line, the processing requirements for determining match points can be reduced by a third.

After determining match points 430, bitmap processor 275 can determine a score associated with each match point. Match point scores can be based on various criteria. In some embodiments, the match point score is determined by combining the representative pixel values of the surrounding pixels and hashing the combined value. Bitmap processor 275 can use many different hash functions known to those skilled in the art. Hash functions can be chosen to reduce the possibility of collisions while also focusing on reducing the required CPU processing requirements for determining the hashes. In some embodiments, bitmap processor 275 uses a bit-shift hash function to determine the score for each match point. Match point scores can be used to distinguish match points that may reference pixels with the same representative pixel value. Because these pixels can have different neighboring pixels, their hashes can be different providing a distinction between the match points. After determining the score for each match point, bitmap processor 275 can search bitmap cache 278 to determine if bitmap processor 275 has previously processed any portion of content 421.

Figure 5:
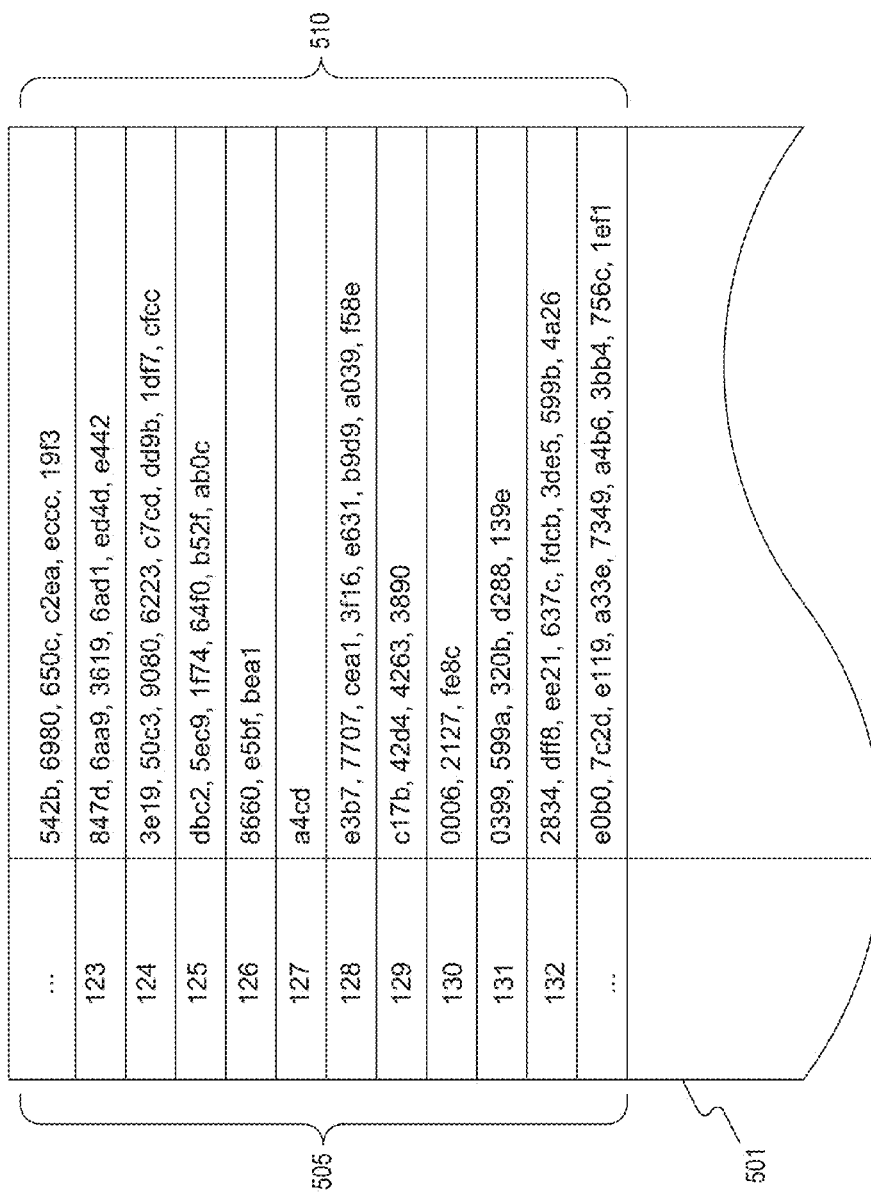
FIG. 5 illustrates an exemplary data structure, consistent with embodiments of the present disclosure.

FIG. 5 illustrates an exemplary data structure used by a bitmap cache (e.g., bitmap cache 278), consistent with embodiments of the present disclosure. Bitmap cache can be any data storage component (e.g., storage 228, system memory 222, cache 240, and/or CPU registers) that allows for the storage of bitmaps along with an reference to those stored bitmaps. Bitmap cache 278 can include data structure 501 associated with particular bitmaps to provide an easily searchable repository of match points associated with those bitmaps. Data structure 501 can include an index 505 of grayscale representative pixel values and match point scores 510 representing scores of all match points of a cached bitmap matching a particular grayscale index. Each pixel in a bitmap can be reduced to a grayscale value. In some embodiments, the color channels for a match point pixel are averaged to produce the grayscale index value. The match point can then be added to a list of match points for the bitmap having the same gray scale value.

After determining match points and match point scores for application window 420 and/or content 421, bitmap processor 275 can search bitmap cache 278 using data structure 501 to find bitmaps matching any region of the current display frame. Bitmap processor 275 can convert the match point pixels of a display frame to representative grayscale pixel value by averaging the integer color values for each of the pixel's color channels. For example, a pixel having an integer value of 255 for the red color channel, 128 for the green color channel, and 1 for the blue color channel would result in an average grayscale value of 128 obtained by averaging the three integer color values.

For each match point, bitmap processor 275 can search bitmap cache 278. Beginning with the most recent bitmap in the cache, bitmap processor 275 can use the grayscale pixel value of the match points in the current display frame as an index to lookup the list of match point scores for the cached bitmap. If the cached match point scores correspond to the match point scores of the current display frame, bitmap processor 275 can compare the current display frame to the cached bitmap to determine the region of the current display frame stored in the cache. Bitmap processor 275 can continue this process until all portions of the current display frame have been found in the cache or all of the bitmaps in the cache have been searched. If any portion of the current display frame remains unmatched, bitmap processor 275 can continue by encoding the unmatched portions (e.g., using bitmap encoder 276) of the current display frame. By determining match points and using those match points as the basis for determining whether a cached bitmap matches the current display frame, bitmap process 275 can greatly reduce the number of cached bitmaps that must be considered as potential matches drastically reducing the processing requirements for searching the cache.

In some embodiments, bitmap processor 275 searches bitmap cache 278 based on the expiration date of the bitmaps in the cache, searching the most recent bitmaps first. It is common for the most recently cached bitmaps to be the most likely bitmaps to produce cache hits. Bitmap processor 275 can first compare the current display frame with the entire previous display frame. In these embodiments, the full comparison can be made without significant additional CPU requirements and can result in a large portion of the display frame being matched, resulting in less cache searching and a reduction in overall CPU requirements.

In some embodiments, when a bitmap matching the current display frame is found, only a portion of the cached bitmap matches the current display frame. In these embodiments, bitmap processor 275 can use the portion of the bitmap stored in the cache and provide any unmatched portion of the display frame to bitmap encoder 276. Where there is a partial cache match, bitmap processor 275 can determine the percentage of the cached bitmap that was matched and adjust the cached bitmap's expiration time proportionally to the percentage matched. In this way, bitmap processor 275 can update the expiration times of entries in bitmap cache 278 based on the frequency and proportion of cache hits. In these embodiments, bitmap processor 275 can maintain the cache, ensuring bitmaps that are frequently matched or that have large percentages of the bitmap reused are kept in the cache. In these embodiments, bitmaps that are not frequently used or do not have large percentages of the bitmap matched can be more likely to be purged from bitmap cache 278 based on the expiration time of the cached bitmaps.

After comparing the display frame with the bitmaps stored in bitmap cache 278, bitmap processor 275 can instruct a remote client to use the remote client's cached versions of bitmaps for regions of the display frame that were found in the cache. This allows the encoder to reduce bandwidth and processing requirements because cached regions of the display frame do not need to be compressed and/or transmitted across a network to a remote client. Bitmap processor 275 can then further process any remaining non-transient regions of the display frame that were not found in bitmap cache 278.

Figure 6:
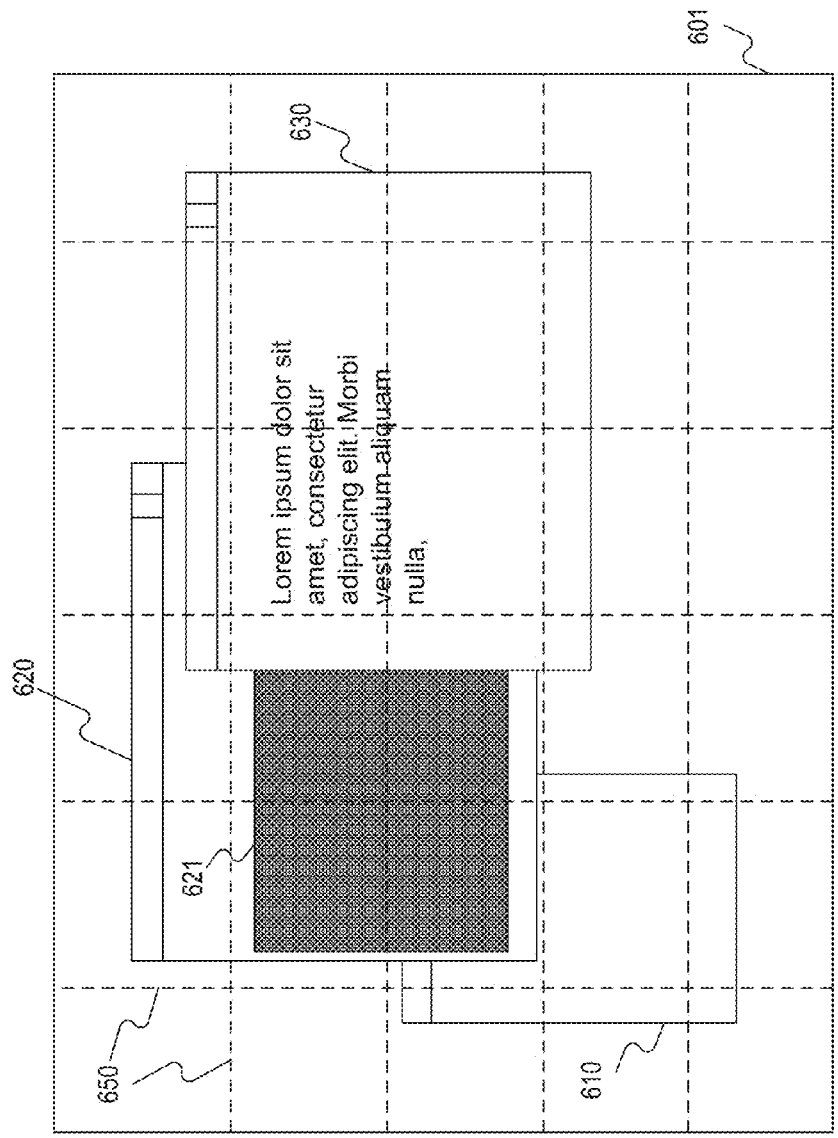
FIG. 6 illustrates an exemplary display frame consistent with embodiments of the present disclosure.

FIG. 6 illustrates an exemplary display frame consistent with embodiments of the present disclosure. The display frame 601 can represent a display of user desktop, such as user desktop 301. Display frame 601 can also represent a frame without any cached regions. Bitmap processor 275 can utilize an encoder (e.g., bitmap encoder 276 from FIG. 2C) to further process display frame 601.

Bitmap encoder 276 can divide display frame 601 into regions. Grid lines 650 are not part of display frame 601. Rather grid lines 650 represent a logical division of display frame 601 into smaller blocks. The size of the blocks created by grid lines 650 can vary. The size can be adjusted to ensure that enough pixels are represented in each box to allow bitmap encoder 276 to make decisions about encoding methods that allow for a consistent user experience. In some embodiments, bitmap encoder 276 uses box sizes measuring 16 pixels high by 16 pixels wide. Using 16×16 pixel boxes can allow bitmap encoder 276 to make use of special instruction sets (e.g., Streaming SIMD Extensions ("SSE")) to process the blocks. By using SSE instructions, bitmap encoder 276 can minimize the CPU requirements for processing display frame 601.

After dividing display 601 into smaller boxes or regions, bitmap encoder 276 can process each individual box to determine the optimal encoding mechanism for that box. Bitmap encoder can classify each region as having predominantly large changes between pixels or predominantly small changes between pixels. Bitmap encoder 276 can compare every pixel in a box with an adjacent pixel to determine if the differences in the color or grayscale representative pixel values between the adjacent pixels are greater than a specified threshold. The threshold can be chosen based on the application, the environment, and/or user or administrator preferences. Boxes having a majority of pixels with differences over the threshold can be classified as boxes having large changes whereas the remaining boxes can be classified as boxes having small changes.

For example, boxes containing a large number of pixels that are part of content 621 can be classified as having small changes. Because content 621 contains a mostly uniform pattern of like colored pixels, bitmap encoder 276 can determine that most of the changes in representative pixel value are below the threshold. Conversely, bitmap encoder 276 can classify boxes containing text, such as the text in application window 630, as having large changes. In some embodiments, boxes containing mostly text are classified as having large changes because text typically produces many pixels having greatly different representative pixel values than adjacent pixels.

After all boxes produced by grid lines 650 are processed, bitmap encoder 276 can combine adjacent boxes into larger aggregate rectangles. For example, the boxes containing content 621 can all be classified as boxes having small changes. Because the boxes are adjacent to each other, bitmap encoder 276 can combine them into a larger region classified as a region having predominantly small pixel value changes.

After making all of the encoding determinations for the display frame, encoder 270 can encode the display frame. Transient regions can be encoded using an appropriate compression and/or encoding algorithm for quickly changing content. Encoder 270 can encode cached regions to instruct a remote client (e.g., client device 102) to draw the regions using bitmaps that are cached on the remote client. This encoding can include the index for the cached bitmap. And encoder 270 can encode any remaining regions based on the pixel makeup of those regions as determined by bitmap encoder 276. After encoding the display frame, encoder 270 can transmit the display frame to a remote device (e.g., client device 102). Additionally, encoder 270 can place any non-transient regions of the display frame (e.g., display frame 601) that were not cached into bitmap cache 278 including the relating match point scores and indexes (e.g., in accordance with data structure 501).

Figure 7:
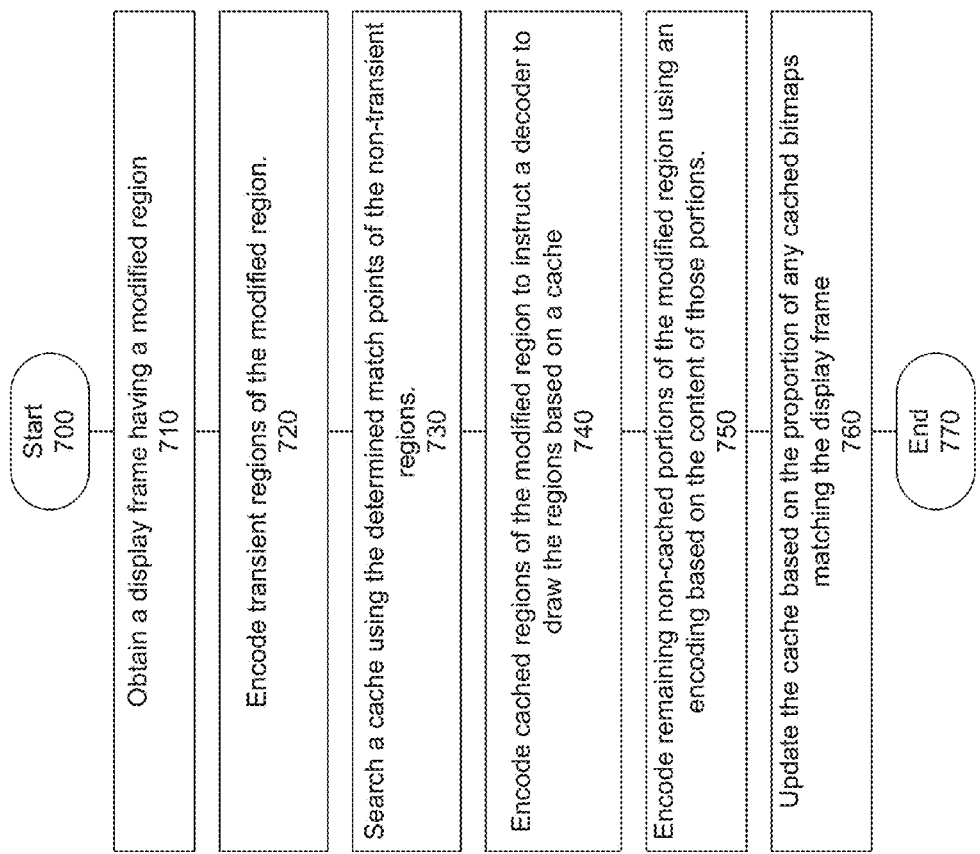
FIG. 7 is a flowchart of an exemplary method for encoding a display frame, consistent with embodiments of the present disclosure.

FIG. 7 is a flowchart of an exemplary method 700 for encoding a display frame, consistent with embodiments of the present disclosure. It will be readily appreciated that the illustrated procedure can be altered to delete steps or further include additional steps. After initial step 700, an encoder (e.g., encoder 270) can obtain (step 710) a display having a modified region. In some embodiments, the operating system (e.g., operating system 251), informs the encoder of the region of the display frame that has been modified. In some embodiments, the display frame is provided by the operating system. The encoder can also obtain the display frame from the frame buffer (e.g., frame buffer 217).

After obtaining a display frame, the encoder can process the modified region of the display frame and encode (step 720) transient regions of the modified region. This process can be performed by a transient region detector such as transient region detector 271. As previously described, transient regions can be rapidly changing regions of the display frame matching specific criteria. The process of detecting transient regions is described further in reference to FIG. 8.

Transient regions, after being identified, can be encoded using a compression and/or encoding mechanism optimized for rapidly changing content. Other types of encoding and/or compression can be used by the transient encoder (e.g., transient region encoder 272) depending on the circumstances and requirements of the particular system and/or users.

The encoder can further process any region not encoded as a transient region. These regions can be processed by a bitmap processor (e.g., bitmap processor 275). The bitmap processor can begin by determining match points and index values for the non-transient modified regions. The process of determining match points is described in further detail in reference to FIG. 9.

After determining match points and index values, the bitmap processor can search (step 730) a bitmap cache (e.g., bitmap cache 278) using the determined index values to obtain potential similar match points from the cache for each cached bitmap. The bitmap processor can then compare the match points associated with the index value for the cached bitmaps to determine if any match points in the cache match the match points for the modified region of the display frame.

If corresponding match points are found in the cache, the bitmap processor can encode (step 740) those regions in a way that instructs a decoder to use cached values to display the frames. Decoders (such as decoders at a remote client) processing the encoded display frame can maintain their own cache of all objects received from the encoder. Accordingly, the encoder can encode cached regions of the display in such a way that indicates where in the cache the decoder can locate the necessary bitmap. This mechanism can drastically reduce the required network bandwidth for communicating with remote clients because the encoder does not have to send memory intensive frame information that has already been provided to the client.

After bitmap processor encodes the cached regions of the display frame, the bitmap processor can encode (step 750) any remaining portions of the modified region of the display frame. Bitmap processor can use a bitmap encoder (e.g., bitmap encoder) to analyze the remaining modified regions. The bitmap encoder can analyze the remaining frames, classifying regions of the frames as having large changes between pixels or small changes between pixels. The process of encoding the remaining portions of the display frame is described in more detail in reference to FIG. 10. The bitmap encoder can encode regions having large changes using an encoding and/or compression mechanism designed to favor quality over size and can encode regions having small changes using an encoding and/or compression mechanism designed to favor size reduction over quality.

After transient regions, cached regions, and non-cached regions are encoded, the encoder can provide the encoded display frame to other components of the computing system. In some embodiments, the encoder transmits the encoded display frame to a remote client device (e.g., client device 102).

The bitmap processor can further update (step 760) the bitmap cache after processing the display frame. The bitmap processor can determine the amount of a cached bitmap that matched the display frame. For example, if the entire cached bitmap matched the display frame, the proportion would be 100%. Further, for example, if half of the cached bitmap matched the display frame, the proportion would be 50%. After the bitmap processor determines the proportion for each matching cached bitmap, the bitmap processor can update those bitmap entries changing their expiration times by the same proportion. For example, a cached bitmap having a 100% proportional match would have its timestamp set to the newest bitmap in the cache. Further, for example, a cached bitmap having a 50% proportion would be updated halfway from its previous timestamp to the current timestamp. In this way, recently used bitmaps can be kept in the cache based on the proportion they were used during cache matching. Accordingly, bitmaps that are less frequently used can keep their initial timestamp and can be more likely to be removed from the cache.

Figure 8:
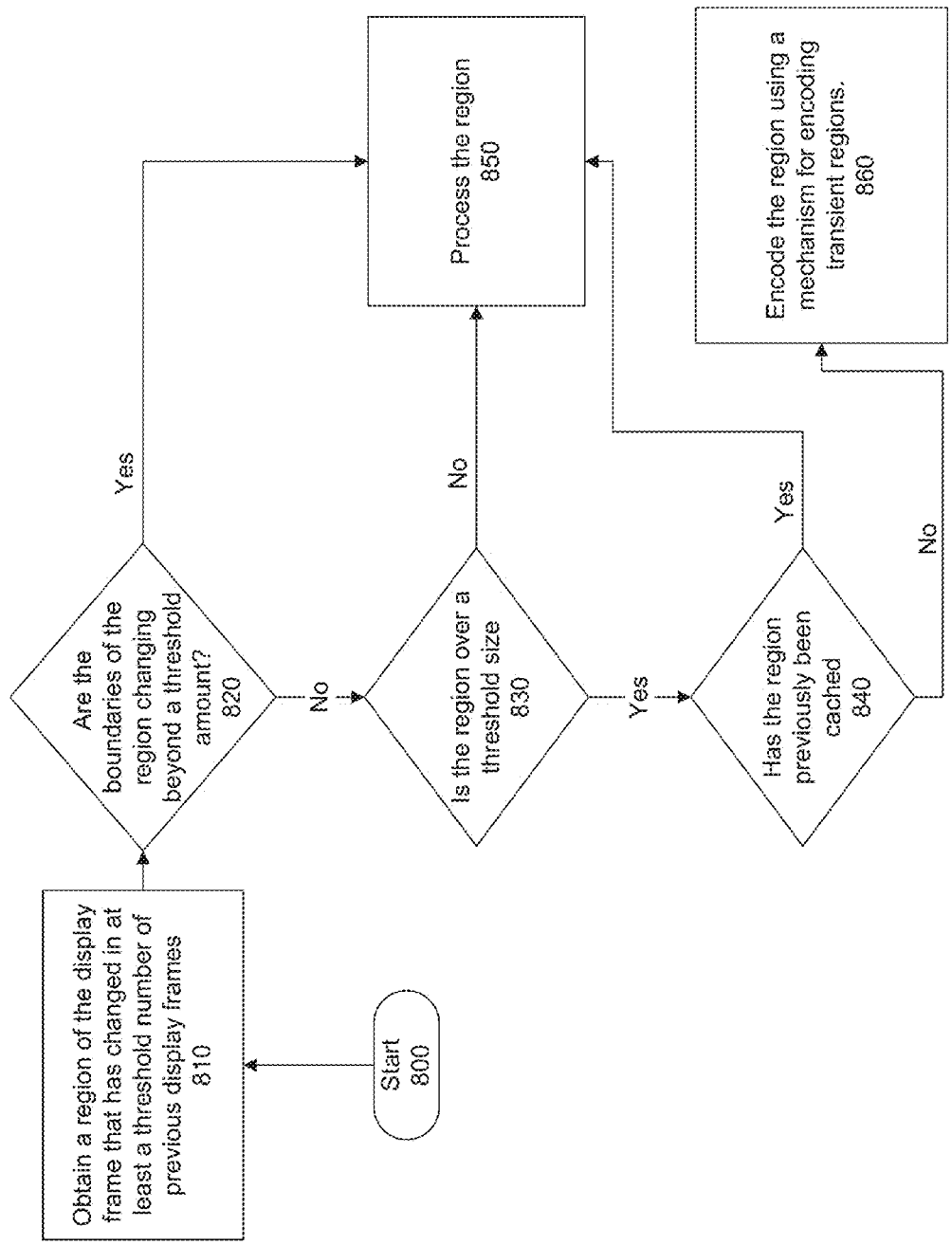
FIG. 8 is a flowchart of an exemplary method for encoding a display frame, consistent with embodiments of the present disclosure.

FIG. 8 is a flowchart of an exemplary method 800 for encoding transient regions of a display frame, consistent with embodiments of the present disclosure. It will be readily appreciated that the illustrated procedure can be altered to delete steps or further include additional steps. As described in FIG. 7, a transient region detector (e.g., transient region detector 271) can process a display frame using a transient region encoder (e.g., transient region encoder 272) to encode the transient regions of the display frame. A transient region can be a region that is rapidly changing across multiple display frames. A predetermined set of criteria can define a transient region.

For example, a transient region can be a region larger than a predetermined size, a region that has changed in a threshold number of previous display frames, and a region that has boundaries that have remained within a threshold amount of change over a number of previous display frames. These criteria are exemplary and other criteria can be used to determine regions that are considered transient.

In some embodiments, a frequency change map is used to track transient regions for a display frame. In these embodiments, a data structure can be used to track changes to parts of the display frames over time indicating regions of the display frames that can possibly satisfy the criteria for a transient region. Using a frequency change map can assist with tracking moving transient regions as well as tracking multiple transient regions at the same time.

The transient region detector (e.g., transient region detector 271) can implement method 800. After initial step 800, transient region detector can obtain (step 810) the display frame and modified region from an encoder (e.g., encoder 270). The transient region detector can filter out regions that have not changed from the previous frame or regions that have not changed in a threshold number of previous display frames.

After obtaining regions that are candidates for transient regions, the transient region detector can determine (step 820) whether the boundaries of the region are changing beyond a threshold. The threshold amount can be customizable allowing for some movement or modification of the transient region. If the transient region has remained within the threshold boundaries, transient region detector can continue to step 830. If the boundaries of the candidate regions have changed beyond a threshold amount, the transient region detector can provide those particular regions to a bitmap processor (e.g., bitmap processor 275) for processing.

The transient region detector can process remaining candidate regions by determining the size of the region. If the region is larger than a threshold size (step 830), the transient region detector can continue processing the region at step 840. If the region is smaller than the threshold size, the transient region detector can provide that region to the bitmap processor for processing.

The transient region detector can than process remaining regions by determining if the region has been marked as a cached region in a previous display frame (step 840). If the region has been previously cached, the transient region detector can provide that region to the bitmap processor for processing.

Otherwise, the transient region detector can provide the region to the transient region encoder for encoding. The transient region encoder can encode (step 860) the transient regions using a compression and/or encoding mechanism optimized for rapidly changing content. Other types of encoding and/or compression can be used by the transient region encoder depending on the circumstances and requirements of the particular system and/or users.

Figure 9:
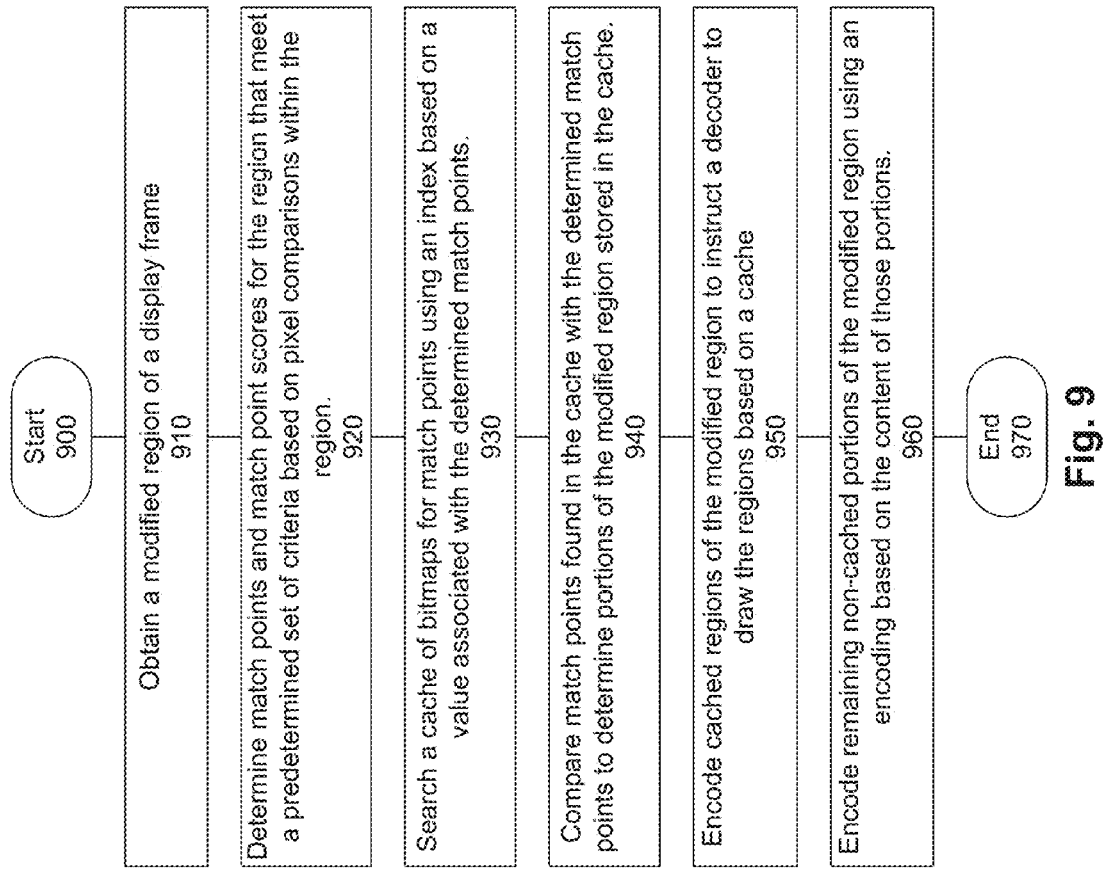
FIG. 9 is a flowchart of an exemplary method for encoding a display frame, consistent with embodiments of the present disclosure.

Regions provided to the bitmap processor can be further processed in accordance with the method previously described and further described in reference to FIG. 9. The set of criteria used by the transient region detector is exemplary. Additional criteria can be added and some of the criteria can be removed depending on the specific needs of, for example, the application, users, and/or computing environment.

FIG. 9 is a flowchart of an exemplary method for encoding a region of a display frame, consistent with embodiments of the present disclosure. It will be readily appreciated that the illustrated procedure can be altered to delete steps or further include additional steps. As described in reference to FIG. 7, an encoder (e.g., encoder 270) can process non-transient regions of a display frame using a bitmap processor (e.g., bitmap processor 275). After an initial step 900, the bitmap processor can obtain (step 910) a modified region of a display frame.

After obtaining the modified region, the bitmap processor can determine match points (step 920) for the modified region. The bitmap processor can scan every pixel of the modified region to determine if each pixel matches specific criteria. As described previously, in some embodiments, a match point can is defined as having a representative pixel value greater than or equal to the adjacent pixel to the left, greater than the pixel to the right, less than or equal to the pixel above, and less than the pixel below. These criteria are exemplary and different criteria may be used. Additionally, the characteristic(s) used to determine a representative pixel value can vary. In some embodiments, the representative pixel value is a grayscale average of the integer values of the pixel's color channels. The representative pixel value can be some combination of the integer values of the color channels of each pixel. Additionally, the representative pixel value can be based on the byte value of the color channels of the pixel.

At the same time, optimizations can influence the representative value comparisons. For example, when analyzing a pixel, some embodiments may utilize the next byte in the display frame stream to allow the bitmap processor to perform 4-byte comparisons even though traditional color display frames only contain 3 bytes per pixel. This optimization can take advantage of various CPU architectures resulting in more efficient processing. Additionally, other efficient processing can be performed. For example, in some embodiments, every third line of pixels in the display frame is skipped. By determining match points for every 2 out 3 lines, these embodiments can still ensure that a bitmap can be matched even if the bitmap is moved up or down any number of lines while reducing the necessary CPU requirements for processing by a third.

After a match point is found, the bitmap processor can further determine a score (step 920) for the match point. The score can be a hash that represents both the match point and some surrounding pixels. In some embodiments, the grayscale values of the pixels surrounding the match point are combined with the match point's grayscale value and the combined value can be bit shifted to create a hash representation of the match point and surrounding pixels.

After the bitmap processor determines match points and scores for the modified region, the bitmap processor can search (step 930) a bitmap cache (e.g., bitmap cache 278) for cached bitmaps matching the modified region. The bitmap processor can determine a grayscale value for the match points by averaging their integer color values. For each bitmap in the cache, the bitmap processor can use the grayscale value as an index (e.g., index 505 in FIG. 5). The index can correspond to cached match point scores for that grayscale value (e.g., scores 510 in FIG. 5). The bitmap processor can then compare (step 940) the scores of the cached bitmap with the scores of the match points from the display frame. If cached scores match the scores of the modified region, the bitmap processor can construct a region of the cached bitmap that corresponds to the current display frame.

After all bitmaps in the cache have been searched, the bitmap processor can encode (step 950) regions found in the cache. The encoding can indicate to a decoder (such as a decoder in a remote client) that the region is a cached region. Decoders capable of decoding display frames encoded consistent with the present disclosure can maintain a local cache of previously received frames. The encoding of cached regions can indicate to the decoder where in the cache the corresponding bitmap can be found. In some embodiments, this encoding can include an index of the cache where the associated bitmaps can be found.

The bitmap processor can provide any remaining regions not found in the cache can to a bitmap encoder (e.g., bitmap encoder 276). The bitmap encoder can encode (step 960) the remaining regions according to the content of those regions. The encoding process is described in more detail in reference to FIG. 10.

Figure 10:
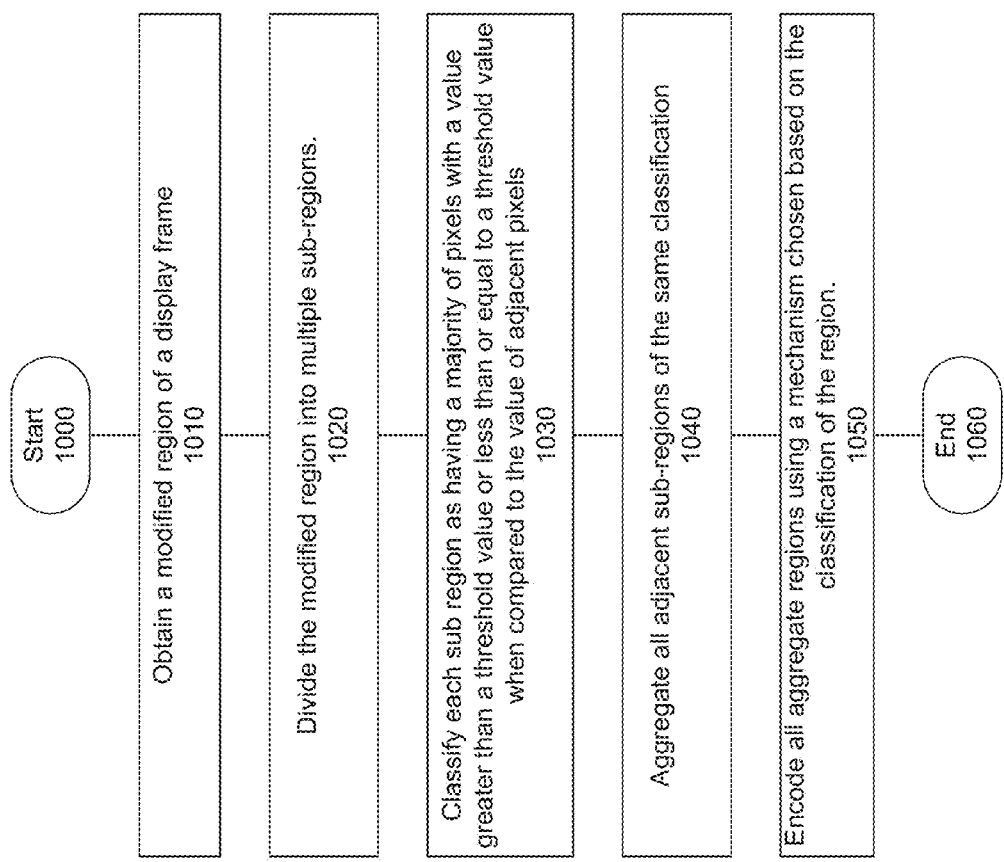
FIG. 10 is a flowchart of an exemplary method for encoding a display frame, consistent with embodiments of the present disclosure.

FIG. 10 is a flowchart of an exemplary method for encoding a display frame, consistent with embodiments of the present disclosure. It will be readily appreciated that the illustrated procedure can be altered to delete steps or further include additional steps. As described in reference to FIG. 7 and FIG. 10, bitmap encoder (e.g., bitmap encoder 276) can process any non-cached regions and/or non-encoded regions of the display remaining after searching the bitmap cache (e.g., bitmap cache 278).

After an initial step (step 1000), bitmap encoder can obtain (step 1010) all remaining modified regions of the modified region of the display frame that were not found in the cache and that were not transient. Bitmap encoder can divide (step 1020) these regions into smaller sub-regions as demonstrated by the boxes created by grid lines 650 in FIG. 6.

After the modified region is divided, the bitmap encoder can process each individual sub-region and classify (step 1030) each sub-region as having large changes or small changes. To determine the classification, the bitmap encoder can create a grayscale value that represents each pixel. In some embodiments, this representative pixel value is an average of the integer values of the three color channels of the pixel. The representative pixel value can be compared to an adjacent pixel. If the difference between the pixels is larger than a threshold, the change for that pixel can be considered a large change. Otherwise, the change can be considered a small change. If a majority of the differences in the sub-region are large changes, the sub-region can be classified as a large change region. Otherwise, the sub-region can be classified as a small change region.

After all of the sub-regions are classified, the bitmap encoder can aggregate (step 1040) adjacent sub-regions with the same classification into larger sub-regions. This process can improve the efficiency of processing by allowing compression and/or encoding to consider a larger overall area than the smaller, separate sub regions.

After the aggregation step, the bitmap encoder can encode (step 1050) the aggregate regions based on their classification. Generally, regions classified as large change regions represent text areas (e.g., the text area of application window 630 in FIG. 6). Additionally, regions classified as small change regions generally represent non text such as, among other things, solid colors, images, gradients, or patterns. Accordingly, higher quality can be favored for large change regions than small change regions. The bitmap encoder can consider this when encoding the aggregate regions. Large change regions can be encoded using a lossless encoding mechanism that allows for improved quality at a cost of higher size and bandwidth requirements while small change regions can be encoded using a lossy encoding mechanism that sacrifices some quality for lower size and bandwidth requirements.

After the encoding determinations for the transient regions, cached regions, and non-cached regions are made, the encoder (e.g., encoder 270) can encode the display frame according to those determinations. The display frame can then be provided to other components of the computing system (e.g., computing system 200). For example, the encoded display frame can be provided over a network to a remote client (e.g., client device 102) for display as part of a remote computing environment.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A computing device comprising:
a display frame encoder configured to obtain a plurality of display frames; and
a transient region detector configured to, for a display frame of the plurality of display frames, determine whether the display frame includes at least one transient region and/or at least one non-transient region,
wherein the display frame encoder is further configured to:
   if the display frame contains at least one transient region, encode the at least one transient region using a first encoding mechanism;
   if the display frame contains at least one non-transient region, encode the at least one non-transient region using a second encoding mechanism;
   determine a plurality of reference points for the at least one non-transient region, wherein each reference point of the plurality of reference points:
      corresponds to a representative pixel having a pixel value that is different from pixel values of at least some pixels surrounding the representative pixel, and
      is used to acquire from a data storage component at least one bitmap reference corresponding to the at least one portion of the one non-transient region;
   if the at least one portion does not correspond to a bitmap reference of the acquired at least one bitmap reference, encode the at least one portion based on content of the at least one portion, wherein encoding the at least one portion further causes the display frame encoder to:
      divide the at least one portion into at least one sub-region; and
      for each sub-region of the at least one sub-region:
         encode the sub-region using a lossless encoding if a majority of pixels in the sub-region differs from adjacent pixels by a representative pixel value greater than a threshold, and
         encode the sub-region using a lossy encoding if a majority of pixels in the sub-region differs from adjacent pixels by a representative pixel value less than or equal to the threshold; and
   provide the encoded non-transient region and/or the encoded transient region for sending to a second device, wherein the providing of the encoded non-transient region includes the bitmap reference for acquiring any bitmap corresponding to the at least one portion of the non-transient region of the display frame.

2. The computing device of claim 1 wherein the display frame is determined to contain at least one transient region if:
the display frame contains at least one candidate transient region;
the at least one candidate transient region has changed in a predetermined number of the plurality of display frames;
the at least one candidate transient region is larger than a predetermined size;
the size of the at least one candidate transient region is not increasing more than a predetermined threshold amount;
the size of the at least one candidate transient region is not decreasing more than a second predetermined threshold amount; and
the at least one candidate transient region was not in another of the plurality of display frames.

3. The computing device of claim 1, wherein the display frame encoder further comprises a transient region encoder configured to encode the at least one transient region using the first encoding mechanism for encoding images that are changing between the plurality of display frames.

4. The computing device of claim 1, wherein the display frame encoder further comprises a bitmap processor configured to perform the encoding of the at least one non-transient region using the second encoding mechanism, and the determination of the plurality of reference points, and the encoding of the at least one portion based on content of the at least one portion.

5. The computing device of claim 4, wherein the determination of the plurality of reference points further comprises the bitmap processor configured to determine at least one hash associated with plurality of reference points.

6. The computing device of claim 5, wherein the data storage component comprises:
an index corresponding to a representation of the at least one reference point of the plurality of display frames; and
the at least one hash corresponding to the at least one reference point.

7. The computing device of claim 4, wherein the determination of the plurality of reference points is further based on the bitmap processor being configured to compare a representation of at least one pixel with a representation of at least one adjacent pixel.

8. A method performed by a computing device that includes one or more processors and comprising:
obtaining a plurality of display frames;
for a display frame of the plurality of display frames, determining whether the display frame includes at least one transient region and/or at least one non-transient region;

in response to the determination that the display frame contains at least one transient region, encoding the at least one transient region using a first encoding mechanism;

in response to the determination that the display frame contains at least one non-transient region, encoding the at least one non-transient region using a second encoding mechanism, wherein the second encoding mechanism includes:

determining a plurality of reference points for the at least one non-transient region, wherein each reference point of the plurality of reference points:

corresponds to a representative pixel having a pixel value that is different from pixel values of at least some pixels surrounding the representative pixel, and is used to acquire from a data storage component at least one bitmap reference corresponding to the at least a portion of the one non-transient region;

in response to the determination that the at least one portion does not correspond to a bitmap reference of the acquired at least one bitmap reference, encoding the at least one portion based on content of the at least one portion, wherein encoding the at least one portion comprises:

dividing the at least one portion into at least one sub-region; and for each sub-region of the at least one sub-region:

encoding the sub-region using a lossless encoding in response to a majority of pixels in the sub-region differing from adjacent pixels by a representative pixel value greater than a threshold, and encoding the sub-region using a lossy encoding in response to a majority of pixels in the sub-region differing from adjacent pixels by a representative pixel value less than or equal to the threshold; and providing the encoded non-transient region and/or the encoded transient region for sending to a second device, wherein the providing of the encoded non-transient region includes the bitmap reference for acquiring any bitmap corresponding to the at least one portion of the non-transient region of the display frame.

9. The method of claim 8, wherein the display frame is determined to contain at least one transient region if:

the display frame contains at least one candidate transient region;

the at least one candidate transient region has changed in a predetermined number of the plurality of display frames;

the at least one candidate transient region is larger than a predetermined size;

the size of the at least one candidate transient region is not increasing more than a predetermined threshold amount;

the size of the at least one candidate transient region is not decreasing more than a second predetermined threshold amount; and the at least one candidate transient region was not in another of the plurality of display frames.

10. The method of claim 8, wherein encoding the at least one transient region further comprises using the first encoding mechanism for encoding images that are changing between the plurality of display frames.

11. The method of claim 8, wherein determining a plurality of reference points further comprises determining at least one hash associated with the plurality of reference points.

12. The method of claim 8, wherein determining a plurality of reference is further based on comparing a representation of at least one pixel with a representation of at least one adjacent pixel.

13. A non-transitory computer readable storage medium storing a set of instructions that are executable by one or more processors of a computing device to cause the computing device to perform a method comprising:

obtaining a plurality of display frames;

for a display frame of the plurality of display frames, determining whether the display frame includes at least one transient region and/or at least one non-transient region;

if the display frame contains at least one transient region, encoding the at least one transient region using a first encoding mechanism;

if the display frame contains at least one non-transient region, encoding the at least one non-transient region using a second encoding mechanism, wherein the second encoding mechanism includes:

determining a plurality of reference points for the at least one non-transient region, wherein each reference point of the plurality of reference points:

corresponds to a representative pixel having a pixel value that is different from pixel values of at least some pixels surrounding the representative pixel, and is used to acquire from a data storage component at least one bitmap reference corresponding to the at least a portion of the one non-transient region;

in response to the determination that the at least one portion does not correspond to a bitmap reference of the acquired at least one bitmap reference, encoding the at least one portion based on content of the at least one portion, wherein encoding the at least one portion comprises:

dividing the at least one portion into at least one sub-region; and for each sub-region of the at least one sub-region:

encoding the sub-region using a lossless encoding if a majority of pixels in the sub-region differ from adjacent pixels by a representative pixel value greater than a threshold, and encoding the sub-region using a lossy encoding if a majority of pixels in the sub-region differ from adjacent pixels by a representative pixel value less than or equal to the threshold; and providing the encoded non-transient region and/or the encoded transient region for sending to a second device, wherein the providing of the encoded non-transient region includes the bitmap reference for acquiring any bitmap corresponding to the at least one portion of the non-transient region of the display frame.

14. The non-transitory computer readable storage medium of claim 13, wherein the display frame is determined to contain at least one transient region if:

the display frame contains at least one candidate transient region;

the at least one candidate transient region has changed in a predetermined number of the plurality of display frames;

the at least one candidate transient region is larger than a predetermined size;

the size of the at least one candidate transient region is not increasing more than a predetermined threshold amount;

the size of the at least one candidate transient region is not decreasing more than a second predetermined threshold amount; and the at least one candidate transient region was not in another of the plurality of display frames.

15. The non-transitory computer readable storage medium of claim 13, wherein encoding the at least one transient region further comprises using the first encoding mechanism for encoding images that are changing between the plurality of display frames.

16. The non-transitory computer readable storage medium of claim 13, wherein determining a plurality of reference points further comprises determining at least one hash associated with the plurality of reference points.

17. The non-transitory computer readable storage medium of claim 13, wherein determining a plurality of reference is further based on comparing a representation of at least one pixel with a representation of at least one adjacent pixel.

* * * * *